United States Patent
Morimura et al.

(10) Patent No.: US 8,909,571 B2
(45) Date of Patent: *Dec. 9, 2014

(54) UPDATING POLICY PARAMETERS UNDER MARKOV DECISION PROCESS SYSTEM ENVIRONMENT

(71) Applicant: International Business Machines Corporation, Armonk, NY (US)

(72) Inventors: Tetsuro Morimura, Tokyo (JP); Takayuki Osogami, Tokyo (JP); Tomoyuki Shirai, Fukuoka (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/898,740

(22) Filed: May 21, 2013

(65) Prior Publication Data
US 2013/0325764 A1    Dec. 5, 2013

(30) Foreign Application Priority Data
May 22, 2012  (JP) .................................. 2012-116440

(51) Int. Cl.
G06F 15/18    (2006.01)
G06N 99/00    (2010.01)
G06N 5/02     (2006.01)

(52) U.S. Cl.
CPC ............... *G06N 99/005* (2013.01); *G06N 5/02* (2013.01)
USPC ......................................................... 706/14

(58) Field of Classification Search
USPC ......................................................... 706/14
See application file for complete search history.

(56) References Cited

U.S. PATENT DOCUMENTS

| | | | |
|---|---|---|---|
| 7,562,004 B2 | 7/2009 | Osogami et al. | |
| RE41,249 E * | 4/2010 | Sato et al. | 428/426 |
| 8,201,174 B2 * | 6/2012 | Osogami | 718/102 |
| 8,494,806 B2 * | 7/2013 | Kato et al. | 702/179 |
| 8,639,556 B2 * | 1/2014 | Morimura et al. | 705/7.28 |

FOREIGN PATENT DOCUMENTS

| | | |
|---|---|---|
| JP | 08-077130 | 3/1996 |
| JP | 10091607 | 4/1998 |
| JP | 2003036339 A | 2/2003 |
| JP | 2002307337 A | 10/2003 |
| JP | 2005274363 A | 10/2005 |
| JP | 2007065929 A | 3/2007 |

(Continued)

OTHER PUBLICATIONS

Bagnell, J. Andrew, et al. "Covariant Policy Search", Proceedings of the International Joint Conference on Artificial Intelligence, Jul. 2003, pp. 1019-1024.

(Continued)

*Primary Examiner* — Michael B Holmes
(74) *Attorney, Agent, or Firm* — Cantor Colburn LLP

(57) ABSTRACT

Embodiments relate to updating a parameter defining a policy under a Markov decision process system environment. An aspect includes updating the policy parameter stored in a storage section of a controller according to an update equation. The update equation includes a term for decreasing a weighted sum of expected hitting times over a first state (s) and a second state (s') of a statistic on the number of steps required to make a first state transition from the first state (s) to the second state (s').

10 Claims, 8 Drawing Sheets

(56) References Cited

FOREIGN PATENT DOCUMENTS

| JP | 2009230645 A | 10/2009 |
|---|---|---|
| JP | 2009289199 A | 12/2009 |
| JP | 2010092247 A | 4/2010 |

OTHER PUBLICATIONS

Bartlett, Peter L. et al., "Estimation and Approximation Bounds for Gradient-Based Reinforcement Learning", Proc. Annual Conference on Computational Learning Theory, 2000, pp. 133-141

Baxter, et al., "Infinite-Horizon Policy-Gradient Estimation", Journal of Artificial Intelligence Research, vol. 15, 2001, pp. 319-350.

Greensmith et al., "Variance Reduction Techniques for Gradient Estimates in Reinforcement Learning", Journal of Machine dLearning Research 5 (2004) pp. 1471-1530.

Kakade, Sham "A Natural Policy Gradient", Advance in Neural Information Processing Systems, vol. 14, MIT Press, 2002, 8 pgs.

Kakade, Sham M., "On the Sample Complexity of Reinforcement Learning", PhD Thesis, University of College London, Mar. 2003, 133 pgs.

Levin, David A. et al., "Markov Chains and Mixing Times", American Mathematical Society, Providence, RI, 2008, 387 pgs.

Morimura et al., "A New Natural Policy Granted by Stationary Distribution Metric", European Conference on Machine Learning and Principles and Practice of Knowledge Discovery in Databases, 2008, 16 pgs.

Williams, Ronald J., "Simple Statistical Gradient-Following Algorithms for Connectionist Reinforcement Learning", Machine Learning, 8, (1992), pp. 229-256.

* cited by examiner

UPDATING POLICY PARAMETERS UNDER MARKOV DECISION PROCESS SYSTEM ENVIRONMENT

PRIORITY

This application claims priority to Japanese Patent Application No. 2012-116440, filed May 22, 2012, and all the benefits accruing therefrom under 35 U.S.C. §119, the contents of which in its entirety are herein incorporated by reference.

BACKGROUND

The present invention generally relates to a search technique for a decision-making model, and particularly, to learning under a Markov decision process system environment. More specifically, the present invention relates to a method, controller, and control program product for updating a parameter that defines a policy under a Markov decision process (MDP) system environment.

A Markov decision process is a conventionally known stochastic decision-making process. A typical problem formulated as a Markov decision process has widespread application in areas such as autonomous control problems of a business decision-making model, a robot, a plant, a mobile vehicle (e.g., a train, a car, a ship, or an airplane) and the like. The business decision-making model is, for example, decision-making support for marketing, a Web service or the like. Learning about a decision-making model is an important data analysis technique in a wide variety of fields such as in optimizing a decision-making support system for marketing, optimizing a Web service, or learning about an agent behavior model for traffic simulation.

BRIEF SUMMARY

According to an embodiment of the present invention, a method for updating a parameter defining a policy under a Markov decision process system environment is provided. The method includes updating the policy parameter stored in a storage section of a controller according to an update equation. The update equation includes a term for decreasing a weighted sum of expected hitting times over a first state (s) and a second state (s') of a statistic on the number of steps required to make a first state transition from the first state (s) to the second state (s').

According to another embodiment of the present invention, a system for updating a parameter defining a policy under a Markov decision process system environment is provided. The system includes a computer processor and logic executable by the computer processor. The logic is configured to implement a method. The method includes updating the policy parameter stored in a storage section of a controller according to an update equation. The update equation includes a term for decreasing a weighted sum of expected hitting times over a first state (s) and a second state (s') of a statistic on the number of steps required to make a first state transition from the first state (s) to the second state (s').

According to a further embodiment of the present invention, a computer program product for updating a parameter defining a policy under a Markov decision process system environment is provided. The computer program product includes a storage medium having computer-readable program code embodied thereon, which when executed by a computer processor, causes the computer processor to implement a method. The method includes updating the policy parameter stored in a storage section of a controller according to an update equation. The update equation includes a term for decreasing a weighted sum of expected hitting times over a first state (s) and a second state (s') of a statistic on the number of steps required to make a first state transition from the first state (s) to the second state (s').

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
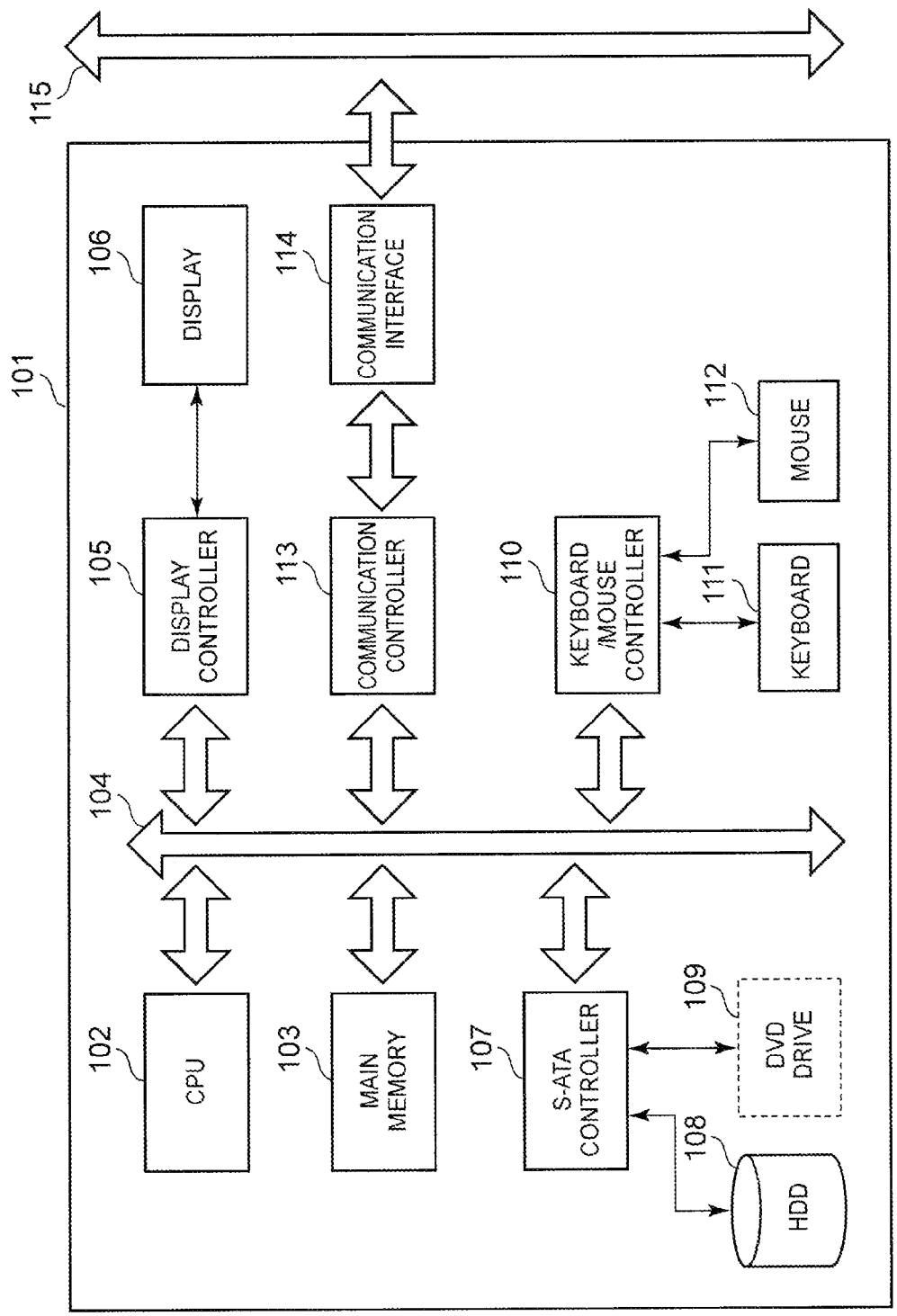
FIG. 1 is a diagram showing an example of a hardware configuration for implementing a controller according to an embodiment.

Embodiments disclosed herein relate to updating a parameter defining a policy under a Markov decision process system environment. An aspect includes updating the policy parameter stored in a storage section of a controller according to an update equation. The update equation includes a term for decreasing a weighted sum of expected hitting times over a first state (s) and a second state (s') of a statistic on the number of steps required to make a first state transition from the first state (s) to the second state (s').

In an environment where sequential decision-making is carried out and the state of the environment progresses over time, a future situation depends on the actions selected in the past. In general, the above environment can be modeled by a Markov decision process. However, in many cases, a model for a target environment is unknown. In other words, the next state is unknown before being actually observed. Therefore, the transition probability of a state of the Markov decision process, or a reward or a cost function in some cases, needs to correspond to the unknown situation. However, no robust technique for such a situation has been established yet in the conventional art.

When the transition probability of a state is known, an efficient technique such as dynamic programming or approximate dynamic programming is applicable. In an unknown environment where the state of the environment progresses over time, a method of updating a decision-making model sequentially in real time (e.g., online) is required.

Further, in some cases, updating of a decision-making model (i.e., updating of a policy or learning about the policy) may change an input pattern to a dynamic system to increase the time required until the dynamic system settles in a stable state (also called "mixing time"). An intuitive image of the mixing time is a time required until a Markov chain settles in a steady state or in a steady distribution.

As a result of the unnecessary increase in mixing time, many samples will be required for estimation of statistics used to update the decision-making model. In other words, a large number of samples will be required before learning about the optimal policy. Further, it is theoretically analyzed and widely known that the increase in mixing time generally leads to inefficient learning. For example, a relationship between the mixing time and the maximum expected hitting time can be expressed in the following equation:

$$t_{mix}(\theta) \leq 4h^*(\theta)+1,\qquad\text{[Math. 1]}$$

where $t_{mix}(\theta)$ denotes the mixing time, and $h^*(\theta)$ denotes the maximum expected hitting time.

There is no method of directly controlling the mixing time in the conventional art. Further, for example, in a two-state two-action Markov decision process model, it is known that when the initial policy is biased, the stagnation of learning easily occurs. Additionally, for example, in a complicated Markov decision process model with three states or more, it is known that the stagnation of learning occurs frequently irrespective of the presence or absence of a bias of the initial policy.

Therefore, embodiments disclosed herein provide a technique capable of solving a policy parameter (i.e., dynamically updating the policy parameter) to enable the implementation of a function for learning a decision-making model while suppressing an unnecessary increase in mixing time. Embodiments further provide a technique robust against initial value dependence or stagnation of learning.

A Markov chain, and the mixing time and hitting time of the Markov chain will be described below. So-called reinforcement learning (RL) is a conventional technique for optimum control over a Markov decision process. The reinforcement learning is a theoretical framework in which an agent learns an action rule (i.e., policy) for maximizing accumulated rewards obtained by trial and error through interaction with the environment (i.e., a control rule when it is used in a control problem). This learning method gets attention from various fields in that the agent needs little transcendental knowledge of the environment and the agent itself.

The reinforcement learning can be classified into two types, namely a value function updating method and a direct policy updating method (i.e., policy gradient method). In the value function updating method, a value function is used to express a policy indirectly, and the policy is updated by updating the value function. In the direct policy updating method, a policy is clearly specified and updated according to the gradient of a target function.

In the direct policy updating method, a parameter for controlling the randomness of an action is contained in a policy parameter θ so that a stochastic policy can be acquired. Especially, the direct policy updating method gets attention because of high applicability to continuous systems. However, in general, when the direct policy updating method is applied to an actual task, the time required until an appropriate action rule is acquired sometimes becomes unrealistic. Therefore, the learning time is shortened by incorporating an auxiliary mechanism, such as concurrent use of multiple learning machines, use of a model, or use of an instruction signal.

A policy gradient reinforcement learning (PGRL) method is a common reinforcement learning algorithm for improving the policy parameter θ by using a partial differentiation of an average reward with respect to the policy parameter θ to maximize the average reward. The partial differentiation of the average reward is also called a policy gradient (PG). The policy gradient reinforcement learning method is a policy search method aimed at acquiring a policy (i.e., action rule) for local maximization of a target function by using, as the target function, a time average value of rewards obtained when the agent interacts with the environment, and updating the policy parameter θ based on the gradient of the target function.

This can be implemented in a Markov decision process without the need for knowledge of the agent or the environment as long as the policy is parameterized properly. Further, if the parameter for controlling the randomness of an action is also contained in the policy parameter θ, a stochastic policy can be acquired.

In the following embodiments, the Markov decision process will be defined by a finite state set S and a finite action set A. Further, an element s∈S of the finite state set and an element a∈A of the finite action set will be considered. Here, d denotes the dimensions of the policy parameter θ and $R^d$ denotes a set of d-dimensional real vectors.

A policy (i.e., decision-making model) is an established model parameterized to be differentiable, which is expressed as π(a|s;θ) according to an embodiment. Here, 'a' denotes an action, 's' denotes a state, and θ denotes a policy parameter. The relationship between action 'a' and state 's' is that a certain action 'a' is taken in a certain state 's'. The policy parameter θ can be a real vector. The policy parameter θ is θ∈$R^d$. Then, in the Markov decision process, a learning agent (also called a learning machine) selects an action $a_t$ at each time step t according to the policy having the probability model π(a|s;θ). In a discrete-time Markov decision process, the policy π(a|s;θ) is given as π(a|s;θ)=Pr(a|s;θ). As a specific probability model of π(a|s;θ), for example, a multinomial logit model, a logistic sigmoid function, or a neural network can be used. It should be noted that, even when the policy is expressed as Pr(a|s;θ) in the following description, it does not means that all but the discrete-time Markov decision process are excluded.

In the Markov decision process, the number of states and the number of actions are known, but the state transition probability and the reward distribution (or cost distribution) are unknown. The learning agent selects an action at each time step t according to a stochastic policy, and receives next state $s_{t+1}$ and reward $r_t$. As a learning problem (e.g., a reinforcement learning problem) the Markov decision process can be considered as a Markov chain having the following state transition probability under a fixed policy:

$$Pr(S_{t+1} \mid S_t; \theta) \equiv \sum_a Pr(S_{t+1} \mid S_t, a) Pr(a \mid S_t; \theta) \qquad\text{[Math. 2]}$$

In the discrete-time Markov decision process, as mentioned above, the learning agent selects action $a_t$ at each time step t according to the policy having the probability model $\pi(a|s;\theta)$ defined by the policy parameter $\theta \in R^d$. Then, a transition to a new state $s_{t+1}$ is made based on the state transition probability $Pr(s_{t+1}|s_t;\theta)$, and an immediate reward $r_{t+1}$ defined by a bounded reward function $r(s_t,a_t,s_{t+i})$ is acquired. The reward function r( ) is of any form as long as it is bounded, and can be determined by a designer according to the problem. For example, if robots are made to play a competitive game aimed at getting points, the reward function can be determined to give a positive large reward at a time step when scoring a point, a negative reward at a time step when the opponent scores a point, and otherwise zero.

Determining the policy parameter $\theta$ means identifying a policy parameter $\theta^*$ for locally maximizing the average reward as a time average of immediate rewards. The policy parameter $\theta$ can be determined according to the following equation:

$$R(\theta) \equiv E\{r \mid \theta\} = \lim_{T \to \infty} \frac{1}{T} \sum_{t=1}^{T} r_t \quad \text{[Math. 3]}$$

A policy $\pi(a|s;\theta^*)$ defined by the policy parameter $\theta^*$ thus identified is called a target policy. It is assumed that the policy $\pi(a|s;\theta)$ is smooth with respect to the parameter $\theta$ (i.e., partial differentiation is possible) and the Markov chain defined by the state transition probability and the policy has ergodicity (i.e., a stationary distribution).

The hitting time is the number of steps required to make a first state transition from a first state (s) to a second state (s'). Further, in a Markov chain $(S_0, S_1, \ldots)$ having the state transition probability $Pr(s_{t+1}|s_t;\theta)$, the hitting time is also the number of expected steps starting from the first state (s) until the first visit to the second state (s').

For example, the hitting time can be expressed in the following equation:

$$\tau(s,s';\theta) \equiv \min\{t \geq 0 | S_0 = s, S_t = s', \theta\} \quad \text{[Math. 4]}$$

The expected hitting time can be defined as a statistic on hitting time. The expected hitting time can be (1) an expected value of the hitting time from the first state (s) to the second state (s'), or an estimate of the expected value, or (2) a value obtained by multiplying the expected value of the hitting time from the first state (s) to the second state (s') by a constant number and adding a constant x to the resultant value, or an estimate of the value. The constant x is a suitable constant.

The expected value of the hitting time from the first state (s) to the second state (s') (i.e., an expected value for a certain random variable X) can be, for example, expressed as E[X(s, s')]. Further, the estimate of the expected value of the hitting time from the first state (s) to the second state (s') can be, for example, expressed as $1/N \sum_{n=1}^{N} X\_n(s,s')$.

The expected hitting time can be, for example, expressed in the following equation:

$$h(s,s';\theta) \equiv E\{\tau(s,s';\theta)\} \quad \text{[Math. 5]}$$

A weighted sum of expected hitting times is a weighted sum over the first state (s) and the second state (s') of the statistic on the expected hitting time, and the weighted sum of expected hitting times can be (1) a weighted sum over the first state (s) and the second state (s') of the expected hitting time function h(s,s'), (2) an addition average over the first state (s) and the second state (s') of the expected hitting time function h(s,s'), or (3) the maximum value over the first state (s) and the second state (s') of the expected hitting time function h(s,s').

The maximum expected hitting time can be, for example, expressed in the following equation:

$$h^*(\theta) \equiv \max_{s,s' \in S} \{h(s, s'; \theta)\} \quad \text{[Math. 6]}$$

The sensitivity of the expected hitting time with respect to the policy parameter $\theta$ can be (1) a partial differentiation of the expected hitting time with respect to the policy parameter $\theta$, or (2) an estimate of the partial differentiation of the expected hitting time with respect to the policy parameter $\theta$.

The partial differentiation of the expected hitting time with respect to the policy parameter $\theta \in R^d$ can be, for example, expressed in the following equation:

$$\nabla_\theta h(s, s'; \theta) \equiv \begin{bmatrix} \frac{\partial h(s, s'; \theta)}{\partial \theta_1} \\ \vdots \\ \frac{\partial h(s, s'; \theta)}{\partial \theta_d} \end{bmatrix} \quad \text{[Math. 7]}$$

According to an embodiment, in order to prevent an index resulting from time distance of a state pair of the Markov decision process (such as the maximum expected hitting time as the upper bound of the mixing time, which is difficult to estimate) from increasing unnecessarily and hence leading to inefficient learning, the amount of a conventional policy update is regularized by the sensitivity of the index to the policy parameter $\theta$, such as by a partial differentiation of the index.

The index can be estimated by estimation approach 1 of an embodiment to be described below. The sensitivity can be estimated by estimation approach 2 of an embodiment to be described below. Then, the regularization can be realized by an update method for the policy parameter $\theta$ (including steps 1 and 2) to be described later. The regularization can suppress an increase in mixing time.

(A) In Re Estimation Approaches 1 and 2

According to an embodiment, the policy parameter $\theta$ can be updated by solving an update equation for updating the policy parameter $\theta$. Specifically, the policy parameter $\theta$ can be updated by using an expected hitting time that can be determined by estimation approach 1 or estimation approach 2 according to an embodiment, or the sensitivity of the expected hitting time or the weighted sum of expected hitting times with respect to the policy parameter $\theta$.

(1) Estimation Approach 1

Estimation approach 1 is an approach for estimating an expected hitting time from an empirical sample according to an embodiment. Estimation approach 1 includes two methods, namely an on-line manner method and a least squares based method. The on-line manner method is lower in computational cost than the least squares based method, but it is inefficient. On the other hand, the least squares based method is less efficient than the on-line manner method, but the computational cost is high. Thus, use of either method of estimation approach 1 can be decided at user's discretion depending on the computational environment, the type of decision-making model, or the like. Further, a user can set use of both of estimation approaches 1 and 2 (as shown in step 403 in FIG. 4A to be described later).

(1-1) On-line manner method of estimation approach 1 according to an embodiment will be described below.

(1-1-A) Initialization of expected hitting time function according to an embodiment (as shown in step 402 in FIG. 4A to be described later)

A controller (201) can initialize the expected hitting time function at time step 0. For example, the controller (201) can initialize the expected hitting time function by using the following equation:

$$h: S \times S \to \mathbb{R}^+,$$ [Math. 8]

where h denotes the expected hitting time function,

S denotes a discrete state set, and $\mathbb{R}^+$ denotes a set of real vectors not less than zero.

Note that when s=s', h($s_t$,s'):=0.

(1-1-B) Update of expected hitting time function according to an embodiment (as shown in step 408 in FIG. 4A to be described later)

The controller (201) can update the expected hitting time function by using the expected hitting time of each state pair ($s_t$,s'), s'∈S at time step t, which state $s_t$ at time step t can take, and the expected hitting time of each state pair ($s_t$,s'), s'∈S at time step t+1, which state $s_t$ at time step t can take.

The controller (201) can update the expected hitting time function at each time step t+1 according to the following equation:

$$h(s_t,s'):=h(s_t,s')+\alpha_t \delta_t(s'), s' \in S$$ [Math. 9]

where h denotes the expected hitting time function,

:=denotes substitution, $\alpha_t$ denotes a learning rate, which may depend on time step t, and δ denotes an error. The learning rate $\alpha_t$ can be, for example, 0.1 or c/(d+t). The parameters c and d can be parameters that can be preset by the user. Note that when $s_t$=s', h($s_t$,s'):=0.

$$\delta_t(s') = \begin{cases} 0, & \text{if } s' = s_t \\ 1 + h(s_{t+1}, s') - h(s_t, s'), & \text{otherwise} \end{cases}.$$ [Math. 10]

Here, 1+h($s_{t+1}$,s'), s'∈{s≠$s_t$,s∈S} denotes the expected hitting time of the state pair ($s_t$,s'), s'∈{s≠$s_t$,s∈S} at time step t+1, which is related to state $s_t$ at time step t, and h(($s_t$,s'), s'∈S denotes the expected hitting time of the state pair ($s_t$,s'), s'∈S at time step t, which is related to state $s_t$ at time step t.

(1-2) Least squares based method of estimation approach 1 according to an embodiment will be described below.

Figure 4A:
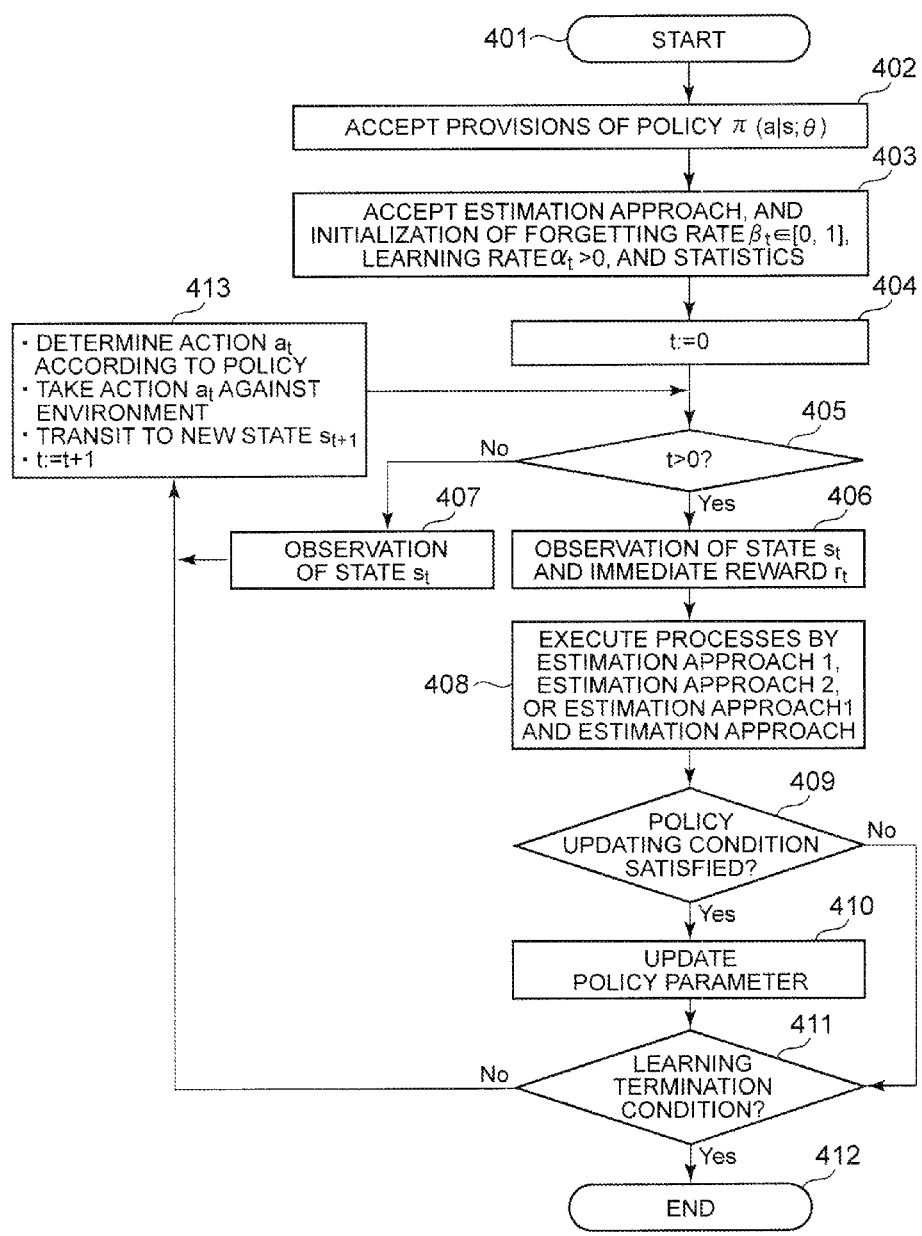
FIG. 4A is a flowchart showing a procedure for updating a policy parameter θ according to an embodiment.

(1-2-A) Initialization of matrix storing statistics for estimation of expected hitting time function according to an embodiment (as shown in step 402 in FIG. 4A)

The controller (201) can initialize a matrix storing statistics for estimation of the expected hitting time function at time step 0. For example, the controller (201) can initialize the matrix by using the following equation:

$$A \in \mathbb{R}^{|S| \times |S|}, b \in \mathbb{R}^{|S| \times 1},$$ [Math. 11]

where A denotes a matrix as the statistics for estimation of the expected hitting time function, S denotes a discrete state set,

|S| denotes the number of elements in the discrete state set, $\mathbb{R}$ denotes a set of real numbers not less than zero, and b denotes a vector as the statistics for estimation of the expected hitting time function.

The controller (201) can initialize the matrix storing the statistics using the following equation as one simple initialization:

$$A:=I_{|S|}, b:=e_{|S|},$$ [Math. 12]

where :=denotes substitution, $I_{|S|}$ denotes a unit matrix of |S|×|S|, and $e_{|S|}$ denotes a vector of which all components of |S|×1 are 1.

(1-2-B) Update of statistics for estimation of expected hitting time function according to an embodiment (as shown in step 408 in FIG. 4A)

The controller (201) can update a matrix A and a vector b as the statistics for estimation of the expected hitting time function at each time step t+1 according to the following equation:

$$A:=\beta_t A + e(s_t)\{e(s_t)-e(s_{t+1})\}^T$$

$$b:=\beta_t b + e(s_t)$$ [Math. 13]

where :=denotes substitution, $e_{|S|}$(i) denotes a vector whose i-th component is 1 and other components are 0, $\beta_t$ denotes a forgetting rate, which may depend on time step t, and $[\ldots]^T$ denotes a transpose of the vector. The forgetting rate $\beta_t$ can be, for example, 0.95 or tan h(f+t). The parameter f is a parameter that can be preset by the user.

The controller (201) can calculate the expected hitting time function using the following equation. The controller (201) can calculate the expected hitting time function only when it is necessary to calculate the expected hitting time (e.g., at the time of updating the policy).

$$h(s, s') := \begin{cases} 0 & \text{if } s = s' \\ (A_{/s'}^{-1} b_{/s'})s & \text{otherwise} \end{cases},$$ [Math. 14]

where :=denotes substitution, $A_{/s'}$ denotes a matrix obtained by removing the s'-th row and the s'-th column from the matrix A, $(b)_s$ denotes the s-th component of the vector b, and $b_{/s'}$ denotes a vector obtained by removing the s'-th component from the vector b.

As an application example of updating the policy parameter θ using only estimation approach 1 of an embodiment, there can be estimation of distance (i.e., degree of association) between all people/items such as social networks, or estimation of time distance (i.e., degree of connection) between two points such as a road network.

(2) Estimation Approach 2

Estimation approach 2 of an embodiment is an approach for calculating or updating the sensitivity of the expected hitting time with respect to the policy parameter θ from an empirical sample, such as a partial differentiation of the expected hitting time with respect to the policy parameter or an estimate of the partial differentiation. Estimation approach 2 includes two methods, namely an on-line manner method and a least squares based method according to an embodiment. The on-line manner method is lower in computational cost than the least squares based method, but it is inefficient. On the other hand, the least squares based method is more efficient than the on-line manner method, but the computational cost is high. Thus, depending on the computational environment, the type of decision-making model, or the like, the user can arbitrarily determine which method of estimation approach 2 of an embodiment is to be used.

(2-1) On-line manner method of estimation approach 2 according to an embodiment will be described below.

(2-1-A) Initialization of partial differential function of expected hitting time function with respect to policy parameter θ (i.e., expected hitting time sensitivity function) according to an embodiment (as shown in step 402 in FIG. 4A)

The controller (201) can initialize a function of a state pair (s,s') of the first state (s) and the second state (s') at time step 0, i.e., an expected hitting time sensitivity function. For example, the controller (201) can initialize the expected hitting time sensitivity function by using the following equation:

$$\nabla h : S \times S \to \mathbb{R}^d,$$ [Math. 15]

where $\nabla h$ denotes the expected hitting time sensitivity function,

S denotes a discrete state set, $\mathbb{R}^d$ denotes a set of real vectors whose d dimension is 0 or more, and d is the number of dimensions of the policy parameter θ.

Note that when $s_t = s'$, $\nabla h(s_t, s') := 0$.

(2-1-B) Calculation of expected hitting time sensitivity function according to an embodiment (as shown in step 408 in FIG. 4A)

The controller (201) can update the expected hitting time sensitivity function by using the sensitivity of the expected hitting time of each state pair ($s_t$, s') (s'∈S) at time step t with respect to the policy parameter, which state $s_t$ can take at time step t, and the sensitivity of the expected hitting time of each state pair ($s_t$, s') (s'∈S) at time step t+1 with respect to the policy parameter θ, which state $s_t$ can take at time step t.

The controller (201) can update the expected hitting time sensitivity function at each time step t+1 according to the following equations:

$$\nabla h(s_t, s') := \nabla h(s_t, s') + \alpha_t \delta_t(s'), \forall s' \in S,$$ [Math. 16]

where $\nabla h$ denotes the expected hitting time sensitivity function,

:= denotes substitution, $\alpha_t$ denotes a learning rate, which may depend on time step t, and δ denotes an error. The learning rate $\alpha_t$ can be, for example, 0.1 or c/(d+t). The parameters c and d can be parameters that can be preset by the user.

Note that when $s_t = s'$, $\nabla h(s_t, s') := 0$, and $$\delta_t(s') = \begin{cases} 0, & \text{if } s' = s_t \\ h(s_{t+1}, s') \nabla_\theta \log Pr(a_t \mid s_t, \theta) + \nabla h(s_{t+1}, s') \\ -\nabla h(s_t, s'), & \text{otherwise} \end{cases}$$ [Math. 17]

Here $h(s_{t+1}, s')\nabla_\theta \log Pr(\alpha_t | s_t, \theta) + \nabla h(s_{t+1}, s')$ expresses the sensitivity of the state pair ($s_t$, s'), s'∈{s≠$s_t$, s∈S} at time step t+1, which is related to state $S_t$ at time step t, where h denotes the expected hitting time function, $\nabla h$ denotes the expected hitting time sensitivity function, $\nabla h(s_t, s')$ denotes the sensitivity of the state pair ($s_t$,s'), s'∈S at time step t, which is related to state $S_t$ at time step t, and $\nabla_\theta \log Pr(\alpha_t | s_t, \theta)$ denotes a partial differentiation of the logarithm of a probability of selecting action $a_t$ in state $s_t$ defined by the policy $Pr(\alpha|s, \theta)$ with respect to the policy parameter θ. The learning rate $\alpha_t$ can be, for example, 0.1 or c/(d+t). The parameters c and d can be parameters that can be preset by the user.

(2-2) Least squares based method of estimation approach 2 according to an embodiment will be described below.

(2-2-A) Initialization of matrix storing statistics for estimation of expected hitting time function according to an embodiment (as shown in step 402 in FIG. 4A)

The controller (201) can initialize a matrix storing statistics for estimation of the expected hitting time function at time step 0. For example, the controller (201) can initialize the matrix by using the following equation:

$$A \in \mathbb{R}^{|S| \times |S|}, B \in \mathbb{R}^{|S| \times d},$$ [Math. 18]

where A denotes the matrix as the statistics for estimation of the expected hitting time sensitivity function, S denotes a discrete state set,

|S| denotes the number of elements in the discrete state set, $\mathbb{R}^d$ denotes a set of d-dimensional real vectors, B denotes a matrix as the statistics for estimation of the expected hitting time sensitivity function, and d denote the number of dimensions of the policy parameter θ.

The controller (201) can initialize the matrix storing the statistics using the following equation as one simple initialization:

$$A := I_{|S|}, B := 0,$$ [Math. 19]

where A denotes a matrix as the statistics for estimation of the expected hitting time sensitivity function, := denotes substitution, I|S| denotes a unit matrix of |S|×|S|, and B denotes a matrix as the statistics for estimation of the expected hitting time sensitivity function.

(2-2-B) Update of statistics for estimation of the expected hitting time function according to an embodiment (as shown in step 408 in FIG. 4A)

The controller (201) can update the matrix A and the matrix B as the statistics for estimation of the expected hitting time sensitivity function at each time step t+1 according to the following equation. The controller (201) can update the policy parameter θ by using the updated matrix A and matrix B.

$$A := \beta_t A + e(s_t)\{e(s_t) - e(s_{t+1})\}^T$$

$$B := \beta_t B + e(s_t) h(s_{t+1}, :) \nabla_\theta \log Pr(a_t | s_t, \theta)^T,$$ [Math. 20]

where := denotes substitution, e(i) denotes a vector whose i-th component is 1 and other components are 0, $\beta_t$ denotes a forgetting rate, which may depend on time step t, $h(s_{t+1}, :)$ denotes a column vector $[h(s_{t+1},1), h(s_{t+1},|S|)]^T$ with elements the number of which is |S|, $a_t$ denotes an action, $\nabla_\theta \log Pr(a_t|s_t, \theta)^T$ denotes a partial differentiation of the logarithm of a probability model Pr(a|s;θ) with respect to the policy parameter θ, and $[\ldots]^T$ denotes a transpose of the vector.

The forgetting rate $\beta_t$ can be, for example, 0.95 or tan h(f+t). The parameter f is a parameter that can be preset by the user. The forgetting rate $\beta_t$ in estimation approach 2 of an embodiment does not need to be the same as the forgetting rate $\beta_t$ in estimation approach 1 of an embodiment.

The matrix A as the statistics is the same as the matrix A used by the least squares based method in estimation approach 1. Therefore, the matrix A determined in either of estimation approach 1 and estimation approach 2 can be stored in a storage section to enable use of the stored matrix A in the other approach.

The controller (201) can calculate the expected hitting time sensitivity function by using the following equation. The controller (201) can calculate the expected hitting time sensitivity function only when the sensitivity is required (e.g., at the time of updating the policy).

$$\nabla h(s, s') := \begin{cases} 0, & \text{if } s = s' \\ (A_{/s'}^{-1} B_{/s'})_{s,:}^T, & \text{otherwise} \end{cases}, \quad [\text{Math. 21}]$$

where := denotes substitution, 0 denotes a column vector whose number of elements is d and all elements are zero, $A_{/s'}$ denotes a matrix obtained by removing the s'-th row and the s'-th column from the matrix A, $(A)_{\{s,:\}}$ denotes the s-th row of the matrix A, $B_{/s'}$ denotes a matrix obtained by removing the s'-th row from the matrix B, and $[\ldots]^T$ denotes a transpose of the vector.

Estimation approaches 1 and 2 may be used separately, or either of them may be used according to an embodiment.

(B) In re update method for policy parameter θ according to an embodiment (as shown in step 410 in FIG. 4A and FIG. 4B to be mentioned below)

According to an embodiment, the update method for the policy parameter θ to suppress the increase in mixing time can be carried out by using each estimate obtained in estimation approach 1 and/or estimation approach 2.

The policy parameter θ can be updated by using a term for decreasing the weighted sum of expected hitting times. The policy parameter θ can be updated by using the following optional equation 1:

$$\theta_{t+1} = \theta_t + \alpha_t \left\{ \Delta\theta - \lambda_t f\left(\sum_{s \in S} \sum_{s' \in S} w_{s,s'}(h) \nabla_\theta h(s, s'; \theta_t)\right) \right\}, \quad [\text{Math. 22}]$$

where θ denotes the policy parameter, $\alpha_t$ denotes a learning rate, which may depend on time step t, Δθ denotes a direction of updating θ by any method for updating the policy parameter based on a gradient method, $\lambda_t$ denotes a regularization rate, which may depend on time step t, f denotes any function, h denotes the expected hitting time function, $w_{s,s'}(h)$ denotes a functional of the expected hitting time function (h) using the weighted value for the state pair (s,s') as a return value, and $\nabla_\theta h$ denotes the sensitivity of the expected hitting time of the state pair (s,s') with respect to the policy parameter. The learning rate $\alpha_t$ can be, for example, 0.1 or c/(d+t). The parameters c and d can be parameters that can be preset by the user.

Optional equation 1 can be, for example, rewritten as the following optional equation 2.

$$\theta_{t+1} = \theta_t + \alpha_t \left\{ \Delta\theta - \lambda_t \sum_{s \in S} \sum_{s' \in S} w_{s,s'}(h) \nabla_\theta h(s, s'; \theta_t) \right\}, \quad [\text{Math. 23}]$$

where θ denotes the policy parameter, $\alpha_t$ denotes a learning rate, which may depend on time step t, Δθ denotes a direction of updating θ by any method for updating the policy parameter based on a gradient method, $\lambda_t$ denotes a regularization rate, which may depend on time step t, h denotes the expected hitting time function, $w_{s,s'}(h)$ denotes a functional of the expected hitting time function (h) using the weighted value for the state pair (s,s') as a return value, and $\nabla_\theta h$ denotes the sensitivity of the expected hitting time of the state pair (s,s') with respect to the policy parameter. The learning rate $\alpha_t$ can be, for example, 0.1 or c/(d+t). The parameters c and d can be parameters that can be preset by the user.

Optional equation 1 can be, for example, rewritten as the following optional equation 3:

$$\theta_{t+1} = \theta_t + \quad [\text{Math. 24}]$$
$$\alpha_t \left\{ \Delta\theta - \lambda_t \max(R^* - \hat{R}, 0) \sum_{s \in S} \sum_{s' \in S} w_{s,s'}(h) \nabla_\theta h(s, s'; \theta_t) \right\},$$

where θ denotes the policy parameter, $\alpha_t$ denotes a learning rate, which may depend on time step t, Δθ denotes a direction of updating θ by any method for updating the policy parameter based on a gradient method, $\lambda_t$ denotes a regularization rate, which may depend on time step t, R* denotes a target average reward value, $\hat{R}$ denotes an estimated average reward value, h denotes the expected hitting time function, $w_{s,s'}(h)$ denotes a functional of the expected hitting time function (h) using the weighted value for the state pair (s,s') as a return value, and $\nabla_\theta h$ denotes the sensitivity of the expected hitting time of the state pair (s,s') with respect to the policy parameter. The learning rate $\alpha_t$ can be, for example, 0.1 or c/(d+t). The parameters c and d can be parameters that can be preset by the user.

R* is a parameter predetermined by the user. $\hat{R}$ is a value estimated by any method. In general, like Δθ, the estimate can be updated at each time step.

Further, $w_{s,s'}(h)$ mentioned above can be either of the following equations:

$$w_{s,s'}(h) = \begin{cases} 1, & \text{if } h(s, s') \geq h(i, j), \forall i, j \in S \\ 0, & \text{otherwise} \end{cases}, \text{ or} \quad [\text{Math. 25}]$$

$$w_{s,s'}(h) = 1, \forall s, s' \in S, \quad [\text{Math. 26}]$$

where h denotes the expected hitting time function.

While the best mode for carrying out the disclosed embodiments will be described in detail below based on the accompanying drawings, the following embodiments do not limit the invention according to the appended claims, and all of the combinations of features to be described in the embodiment are not necessarily essential to the means for solving the problems of the invention. The present invention can be carried out in many different modes. It will be obvious to those skilled in the art that various changes and modifications can be made in the following embodiment.

Throughout the following description of the embodiment, the same reference numerals will be given to the same components unless otherwise noted.

FIG. 1 is a diagram showing an example of a hardware configuration for implementing a controller (e.g., a computer) according to an embodiment.

FIG. 1 shows a controller (101) according to the embodiment. The controller (101) can be, for example, a computer, a computer system, a robot, or any other electronic product. Alternatively, for example, the controller (101) is an IC chip or a control board. For example, the IC chip or the control board can be provided in a computer, a computer system, a robot, or any other electronic product. The controller (101) can be provided with control logic (not shown) as a software configuration. The controller (101) is provided with a CPU (102) and a main memory (103), and these components can be connected to a bus (104). Preferably, the CPU (102) is based on a 32-bit or 64-bit architecture. For example, Intel® Core i™ series, Core 2™ series, Atom™ series, Xeon™ series, Pentium® series, or Celeron® series, or AMD Opteron™ series, Phenom™ series, Athlon™ series, Turion™ series, Sempron™, or A series, or IBM® PowerPC® can be used. A display (106), e.g., a liquid crystal display (LCD), can be connected to the bus (104) through a display controller (105). The display (106) is used to display, on an appropriate graphic interface, information on a computer connected to a network through a communication line in order to manage the computer, and information on software running on the computer. A disk (108) such as a silicon disk or a hard disk can also be connected to the bus (104) through a SATA or IDE controller (107). Further, a drive (109) such as a CD, DVD, or BD drive can be connected arbitrarily to the bus (104) through the SATA or IDE controller (107). Although a keyboard (111) and a mouse (112) can further be connected arbitrarily to the bus (104) through a keyboard/mouse controller (110) or a USB bus (not shown), these elements are not necessities for carrying out the disclosed embodiments.

An operating system, a Python processing environment, a Python application, a program for providing a Python runtime compiler, a Java® computing environment such as J2EE, a Java® application, a Java® virtual machine (VM), a program for providing a Java® just-in-time (JIT) compiler, and other programs and data are stored on the disk (108) in such a manner to be loadable into the main memory. Software capable of inputting and editing code is also stored on the disk (108) in such a manner that a front-end processor (FEP) as character translation processing software can load it into the main memory. Further, data stored persistently and rewritten as needed, such as various statistics and parameters, can be stored on the disk (108). The operating system stored on the disk (108) can be, for example, LINUX® available from a LINUX® distributor, a Windows® operating system available from Microsoft Corporation, MacOS® or iOS® available from Apple Computer Incorporated, or a UNIX® system provided with X Window System (e.g., AIX® available from International Business Machines Corporation®). The operating system can be an embedded operating system embedded in the controller (101). The operating system is loaded into the main memory (103) at power-on to control the CPU (102) and the other peripheral devices.

The drive (109) can be used to install a program from a CD-ROM, DVD-ROM, or BD onto the disk (108) as necessary.

For example, a communication interface (114) follows the Ethernet® protocol. The communication interface (114) is connected to the bus (104) through a communication controller (113) to take a role in physically connecting the computer (101) to a communication line (115) to provide a network interface layer to the TCP/IP communication protocol as a communication function of the operating system on the computer (101). The communication line may be based on a wired LAN environment or a wireless LAN environment such as that based on the Wi-Fi standard such as IEEE802.11a/b/g/n.

A sensor (not shown) and an actuator (not shown) can be connected to the bus (104) through a predetermined I/O interface (not shown). The sensor can be, for example, a GPS and a position detector. For the position detector, a triangulation technique for an indoor radio station, though not limited thereto, as disclosed in Japanese Patent Application Publication No. 2005-274363 can be used. A position signal detected by the sensor is sent to the CPU (102) through the bus (104) so that it can be used to update the policy parameter θ according to a procedure of the disclosed embodiment to be described later. The actuator can be, for example, a mechanism to provide for two-dimensional or three-dimensional movements by means of a motor or the like based on a drive signal sent from the CPU (102) via the bus (104). For example, the actuator can be, but not limited to, a mechanism for driving four wheels appropriately to move a robot two-dimensionally in a room as disclosed in Japanese Patent Application Publication No. 2002-307337.

It can be understood from the above that the computer used in the embodiment is not limited to a specific operating system environment.

Figure 2:
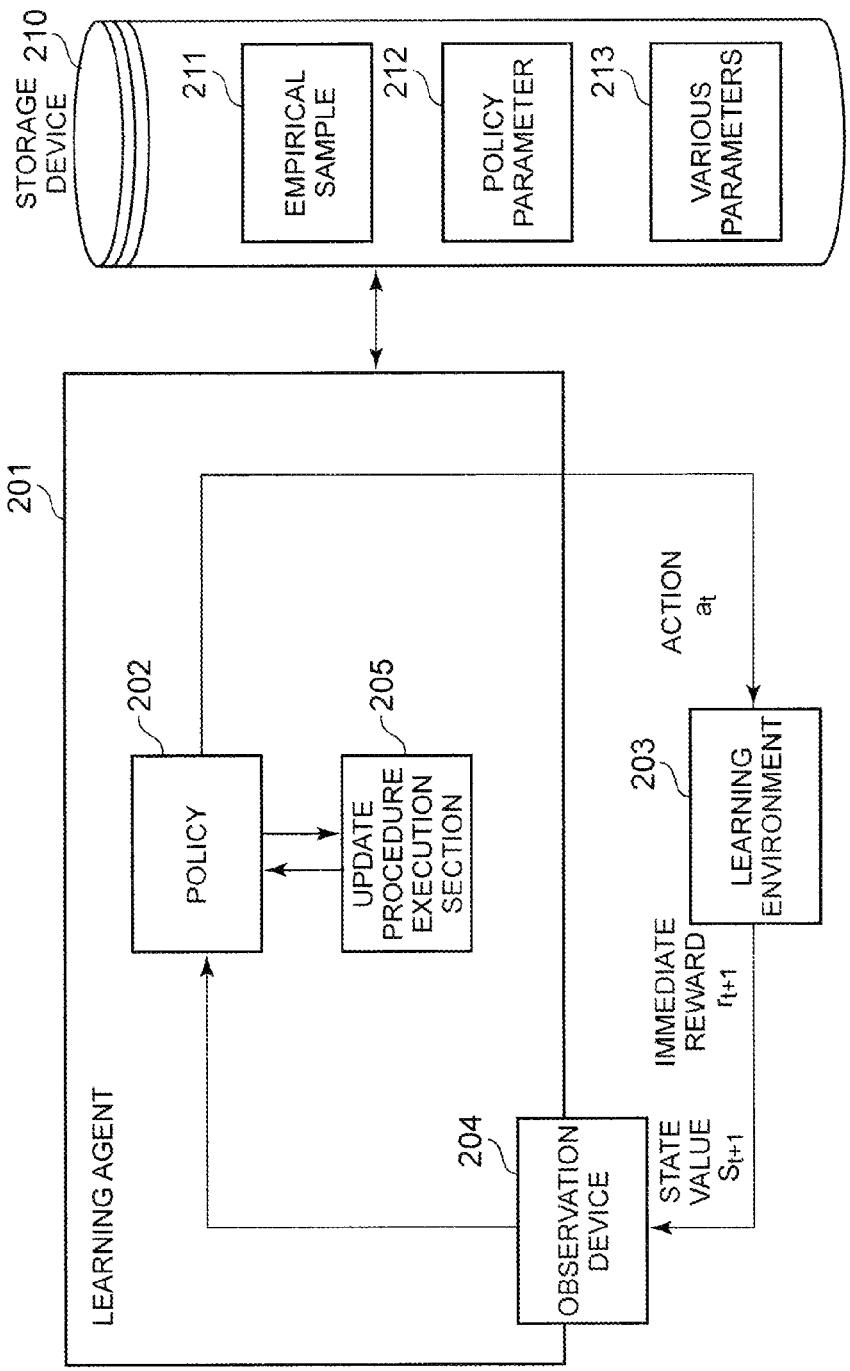
FIG. 2 is a functional block diagram of a controller according to an embodiment.

FIG. 2 is a functional block diagram of a controller including the hardware configuration of FIG. 1 according to the embodiment.

A controller (201) can implement a system for a stochastic decision-making model as a prerequisite for the disclosed embodiment. In the controller (201), a Markov decision process is, for example, defined by a finite state set S and a finite action set A. Further, in the Markov decision process, it is assumed that elements of the finite state set are s∈S and elements of the finite action set are a∈A. Then, in the Markov decision process, a learning agent selects action $a_t$ at each time step t according to a policy 202 having a probability model $\pi(a|s;\theta)$ defined by the policy parameter $\theta \in R^d$. Here, d denotes the dimensions of the parameter θ and $R^d$ denotes a set of d-dimensional real vectors.

The controller (201) includes the policy (202) and an update procedure execution section (205) for implementing the disclosed embodiment.

The controller (201) can also include an observation device (204) therein, or be connected to the observation device (204), or receive observation data from the observation device (204). For example, the observation device (204) can be, but not limited to, a position sensor, an angle sensor, an acceleration sensor, or an angular acceleration sensor. It is assumed that a signal (information) passed from the observation device (204) to the controller is in a discrete state.

Further, the controller (201) can incorporate a storage device (210), or be connected to the storage device (210) located outside of the controller (201) by cable or by radio.

When the controller (201) is, for example, a robot control system, action $a_t$ causes the drive of the above actuator to move a robot in a predetermined room as a learning environment (203). The controller (201) receives immediate reward $r_{t+1}$ according to the movement and the state value becomes $s_{t+1}$. It will be understood by those skilled in the art that the controller (201) is not limited to the robot control system and there are various techniques of application applicable to autonomous control problems of a business decision-making model, a plant, a mobile vehicle (e.g., a train, a car, a ship, or an airplane), and the like.

The state value is observed by the observation device (204) and the observation result of the observation device (204) is input into the policy (202).

The update procedure execution section (205) updates a policy parameter (212) stored in the storage device (210) or the policy parameter θ stored in the memory (103) inside the controller (201) according to an update equation having a term for decreasing the weighted sum (i.e., the weighted sum of expected hitting times) over a first state (s) and a second state (s') of a statistic (i.e., expected hitting time) on the number of steps (i.e., hitting time) required to make a first state transition from the first state (s) to the second state (s'). The term for decreasing the weighted sum of expected hitting times can be derived by using a function (i.e., expected hitting time function) whose arguments are the first state (s) and the second state (s'), and whose return value is an expected hitting time from the first state (s) to the second state (s') and a function (i.e., expected hitting time sensitivity function) as the sensitivity of the expected hitting time from the first state (s) to the second state (s') with respect to the policy parameter θ.

Further, the update procedure execution section (205) can update the policy parameter θ according to estimation approach 1 and estimation approach 2 mentioned above, then according to the above steps 1 and 2 to reflect the updated policy parameter θ in the policy (202).

The policy (202) and the update procedure execution section (205) are called a learning agent because the policy parameter θ is updated as if the CPU (102) has mainly calculated and updated the policy parameter θ based on parameters acquired from the environment.

The storage device (210) can store an empirical sample (211), the policy parameter (212), and various parameters (213) that can be used by the learning agent. The empirical sample (211) can be used by the update procedure execution section (205) when executing estimation approaches 1 and 2. The policy parameter (212) is as mentioned above. For example, the various parameters (213) include, but not limited to, a learning rate $\alpha_t$, a forgetting rate $\beta_t$, statistics, and a state value.

Figure 3A:
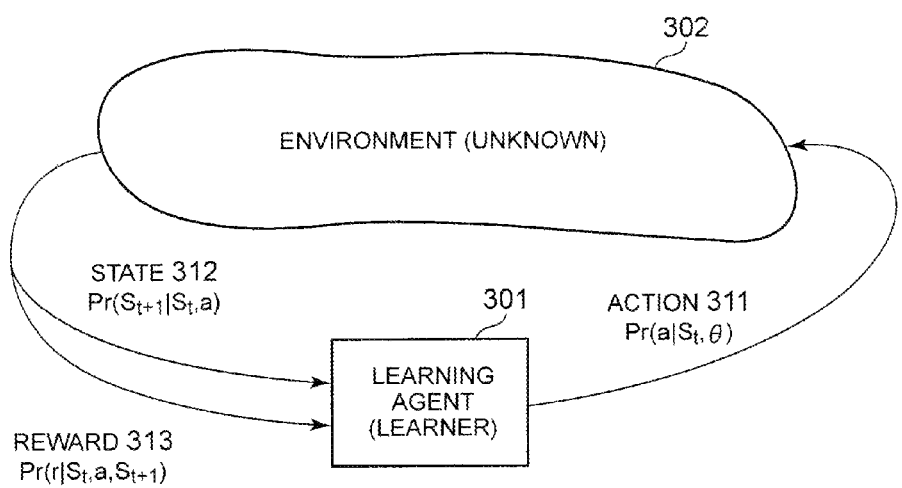
FIG. 3A is a schematic diagram showing standard learning settings according to an embodiment.

FIG. 3A is a schematic diagram showing standard learning settings according to an embodiment.

A learning agent (301) selects an action (311) at each time step t according to a stochastic policy, and receives the next state $s_{t+1}$ (312) and a reward $r_t$ (313). In the Markov decision process, the number of states and the number of actions are known, but state transition probability and reward distribution (or cost distribution) are unknown (302). As a learning problem (e.g., a reinforcement learning problem), the Markov decision process under a fixed policy can be considered to be a Markov chain having the state transition probability as mentioned above.

Figure 3B:
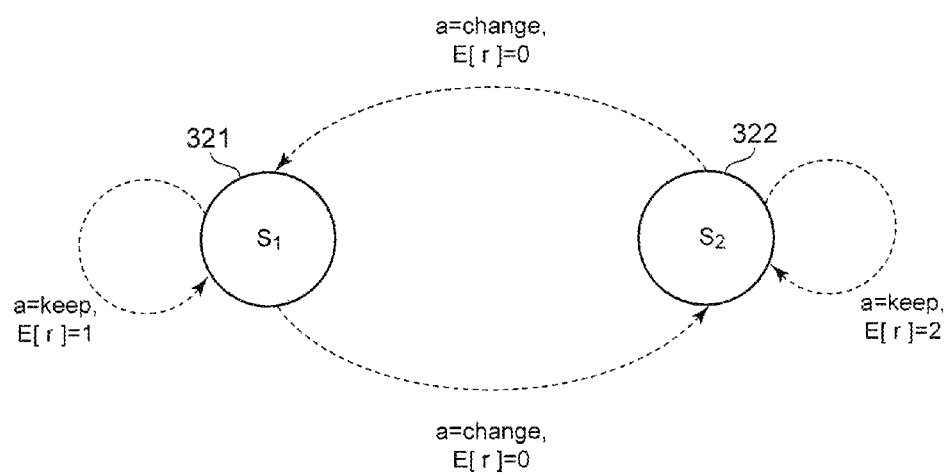
FIG. 3B is a schematic diagram showing a state transition of an environment according to an embodiment.

FIG. 3B is a schematic diagram showing a state transition of an environment according to an embodiment.

FIG. 3B is a diagram for modeling a two-state two-action Markov decision process. A problem setting in FIG. 3B has two choices, e.g., whether to conduct a campaign or not, and such a common situation that it takes time to change the choices is modeled. In the two-state two-action Markov decision process, there is shown a state transition from state $S_1$ (321) to $S_2$ (322) or a reverse state transition, or a self-transition from $S_1$ (321) to $S_1$ (321) or a self-transition from $S_2$ (322) to $S_2$ (322).

In this example, a policy (decision-making model) is expressed in the following equation:

[Math. 27]

$$\begin{cases} Pr(A = \text{keep} \mid S = s_i; \theta) = \frac{1}{1 + \exp(-\theta_i)} \\ Pr(A = \text{change} \mid S = s_i; \theta) = 1 - Pr(A = \text{keep} \mid S = s_i; \theta) \end{cases}$$

In the above problem setting, when the initial policy is biased, it is a benchmark problem of causing a stagnation of learning easily.

Figure 4B:
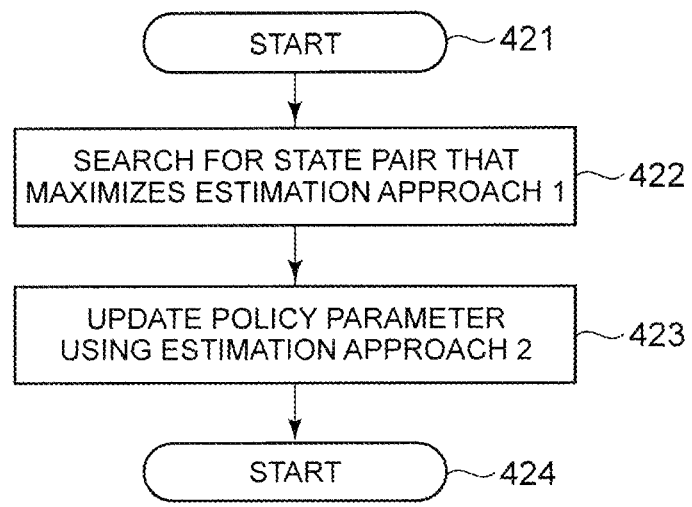
FIG. 4B is a flowchart showing a process for updating the policy parameter θ described in FIG. 4A according to an embodiment.

FIG. 4A and FIG. 4B are flowcharts of a procedure for updating the policy parameter θ according to an embodiment. A program for this procedure can be prestored in a ROM or the hard disk drive (108) and loaded in the main memory (103) so that the program can be executed.

FIG. 4A shows an overall view of a flowchart of the procedure for updating the policy parameter θ according to an embodiment.

In step 401, the update procedure execution section (205) starts the procedure for updating the policy parameter θ according to an embodiment.

In step 402, the update procedure execution section (205) calls a policy π(a|s;θ) into the memory (103). The policy π(a|s;θ) can be, for example, given beforehand by a user to the controller (201). The user can determine the policy π(a|s;θ). In a discrete-time Markov decision process, the policy can be given as π(a|s;θ)≡Pr(a|s;θ).

In step 403, the update procedure execution section (205) calls an estimation approach into the memory (103). The estimation approach is estimation approach 1 and/or estimation approach 2 mentioned above. The user can pre-specify which estimation approach is used by the update procedure execution section (205). Further, the update procedure execution section (205) can initialize the policy π(a|s;θ). When the Markov decision process is a discrete-time Markov decision process, the update procedure execution section (205) can initialize Pr(a|s;θ).

Further, the update procedure execution section (205) can initialize parameters that can be used in estimation approach 1 and estimation approach 2, and by the method of updating the policy parameter θ, and a hyper-parameter. For example, the parameters can include a forgetting rate $\beta_t$, a learning rate $\alpha_t$, and statistics.

The forgetting rate $\beta_t$ can be selected appropriately as a forgetting rate $\beta_t \in [0,1]$. A constant value independent of t may also be selected as the forgetting rate $\beta_t$.

The learning rate $\alpha_t > 0$ may be a positive real number independent of t.

The statistics are initialized, for example, by setting, to zero, all parameters A, B, C, D, E, x, y, F, G, and z used to calculate the statistics. Although the suffix is not shown here, the parameters can be expressed as $A_0, B_0, C_0, \ldots$, for example.

When updating of the policy parameter θ using a conventional technique, e.g., a reinforcement technique, is used concurrently, the update procedure execution section (205) can initialize parameters used in the conventional technique.

Further, the update procedure execution section (205) can determine an initial state ($s_0$).

In step 404, the update procedure execution section (205) sets t to 0.

In step 405, the update procedure execution section (205) determines whether t>0. At the first stage of the procedure, since t:=0 is set, the determination here becomes negative, and the update procedure execution section (205) proceeds to step 407. In response to the fact that the determination result is t>0, the update procedure execution section (205) advances the procedure to step 406. In response to the fact that the determination result is not t>0, the update procedure execution section (205) advances the procedure to step 407. Step 405 means that steps 406 to 411 are executed while repeating t from t<0 to T.

In step 406, in response to the fact that the determination result is t>0, the update procedure execution section (205) accepts $\phi(s_t)$ observed by the observation device (204) and immediate rewards $r_{t+1}$. The observation of $\phi(s_t)$ can be acquired, for example, by detecting the position through the sensor, e.g., the observation device (204).

In step 407, in response to the fact that the determination result is not t>0, the update procedure execution section (205) accepts $\phi(s_t)$ observed by the observation device (204). Then, the update procedure execution section (205) advances the procedure to step 413.

In step 408, the update procedure execution section (205) can use estimation approaches 1 and 2 mentioned above independently to determine an estimate of the expected hitting time or an estimate of the partial differentiation of the expected hitting time. Alternatively, the update procedure execution section (205) can use both of estimation approaches 1 and 2 mentioned above to an estimate of the expected hitting time and an estimate of the partial differentiation of the expected hitting time.

In step 409, the update procedure execution section (205) determines whether to satisfy a condition for updating the policy. Various conditions can be considered as the condition for updating the policy. For example, an integer m larger than 1 can be so set arbitrarily that the condition for updating the policy will be satisfied on condition of mod(t,m)=0. mod(t,m) is a function for outputting a remainder obtained by dividing t by m. Although step 409 is not essential, updating of the policy parameter θ in step 410 is required each time when step 409 is omitted. Execution of step 410 each time may increase the cost, resulting in inefficiency. Therefore, step 409 can be inserted to reduce the cost.

In step 410, in response to the fact that the condition for updating the policy is satisfied, the update procedure execution section (205) uses the above method of updating the policy parameter θ according to an embodiment to update the policy parameter θ. The policy parameter θ may not be updated at each step in a loop from step 406 to step 411. For example, the policy parameter θ may be updated every ten steps in the loop.

Further, the update procedure execution section (205) can update the policy parameter θ according to a method as a conventional technique, e.g., the reinforcement learning method, before or after the method of updating the policy parameter θ according to an embodiment is used.

In step 411, the update procedure execution section (205) determines whether a learning termination condition is satisfied. For example, the learning termination condition is to determine whether t exceeds a given number of steps T (t<T). Alternatively, the update procedure execution section (205) can make a determination when the amount of change from the previous value of the policy parameter θ becomes equal to or smaller than a certain threshold. In response to the fact that the learning termination condition is satisfied, the update procedure execution section (205) advances the procedure to step 412 and ends the processing step started above. On the other hand, in response to the fact that the learning termination condition is not satisfied, the update procedure execution section (205) advances the procedure to step 413.

In step 412, in response to the fact that the learning termination condition is satisfied, the update procedure execution section (205) confirms the policy and returns the confirmed policy π(a|s;θ) to the policy (202). Then, the update procedure execution section (205) ends the procedure for updating the policy parameter θ according to an embodiment.

In step 413, the following is done:
(1) action $a_t$ is determined according to the policy π(at|st; θ),
(2) action $a_t$ is taken against the environment. The action $a_t$ can be taken, for example, by operating the above actuator to move the robot,
(3) As a result of action $a_t$, the state transits to a new state $s_{t+1}$, and
(4) t is incremented by one.

Returning to step 405 via step 413, since the determination result does not become t=0 again any more, the procedure never follows the route from step 405 to step 407 again. Thus, the update procedure execution section (205) advances the procedure to step 406.

FIG. 4B is a flowchart showing the details of the step of updating the policy parameter θ according to an embodiment as described in FIG. 4A.

In step 421, in response to the fact that the condition for updating the policy is satisfied, the update procedure execution section (205) uses the above method of updating the policy parameter θ according to an embodiment to start the procedure for updating the policy parameter θ.

In step 422, the update procedure execution section (205) searches for a state pair selected from the estimates of expected hitting times obtained in step 408 by estimation approach 1, or a state pair with the maximum estimate of the expected hitting time obtained by estimation approach 1.

In step 423, the update procedure execution section (205) updates the policy parameter θ using the estimate of the partial differentiation obtained in step 408 by estimation approach 2.

In step 424, the update procedure execution section (205) completes the procedure for updating the policy parameter θ and proceeds to step 411.

Figure 5:
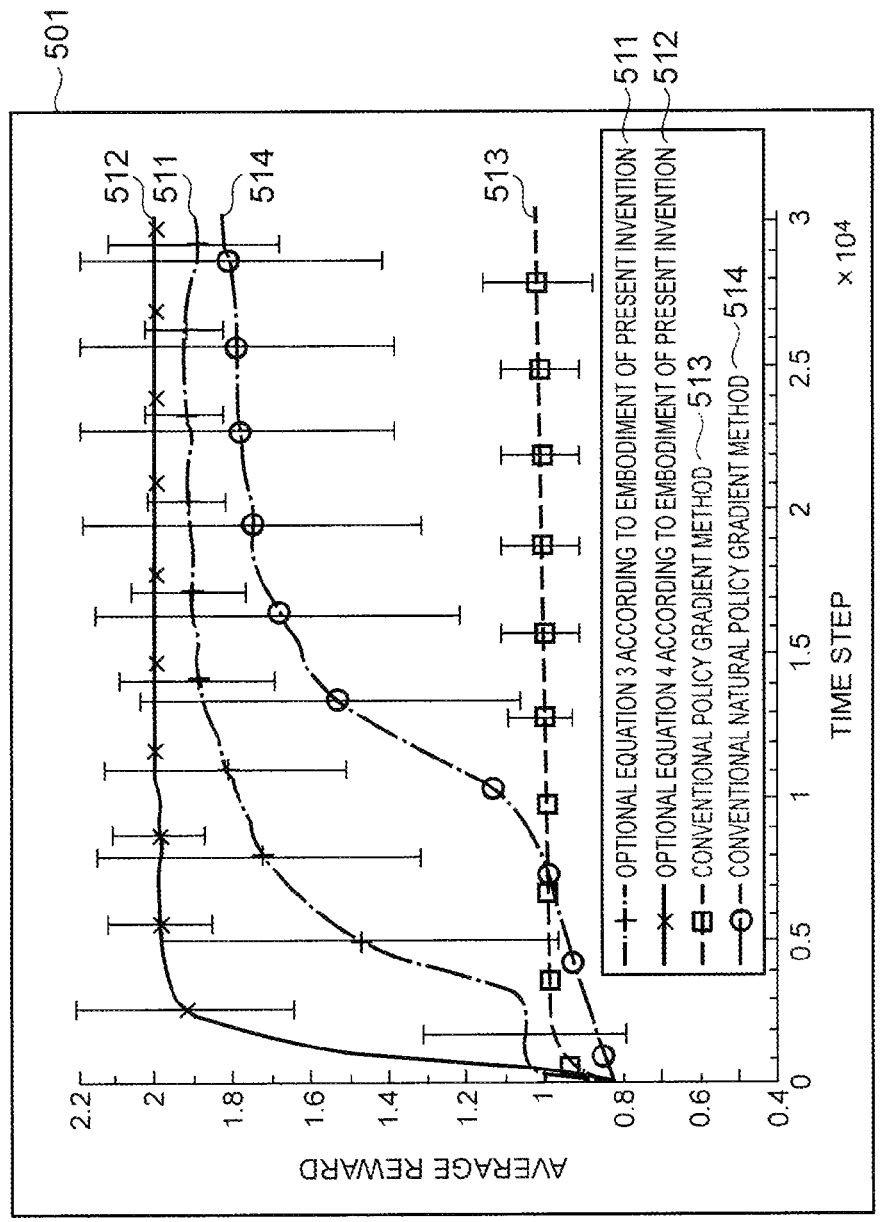
FIG. 5 is a chart showing the simulation results of changes in average reward over time according to the embodiment and conventional methods when the policy parameter θ is updated in a Markov decision process in which an environment having two choices is modeled as shown in FIG. 3B.

FIG. 5 is a chart showing the simulation results of changes in average reward over time according to the embodiment and conventional methods when the policy parameter θ is updated in the Markov decision process (see FIG. 3B) in which an environment having two choices is modeled.

In the chart, the abscissa represents the number of learning trials and the ordinate represents the average reward for 100 trials. Further, the error bar indicates the standard of 100 trials.

The initial policy is as follows:

$Pr(A=\text{keep}|S=s_1)=0.9$ $Pr(A=\text{keep}|S=s_2)=0.1$ [Math. 28]

Test 1 (511) is a case where the policy parameter θ is updated by using option 3 according to an embodiment.

Test 2 (512) is a case where the policy parameter θ is updated by using option 4 according to an embodiment.

Test 3 (513) is a case where the policy parameter θ is updated by using a policy gradient method as a conventional technique.

Test 4 (514) is a case where the policy parameter θ is updated by using a natural policy gradient method as another conventional technique.

The results are as follows: In test 1, a high average reward was observed at an earlier stage of learning trials. In test 2, a high average reward was observed immediately after the start of learning trials. In test 3, a high average reward was observed as the number of learning trials increased. In contrast, in test 4, the average reward stayed about the same from the beginning of learning trials to even after the number of learning trials increased. The scores on the learning rate are test 2 (512)>test 1 (511)>test 3 (513)>test 4 (514).

It was found that the cases where the policy parameter θ was updated according to an embodiment (i.e., test 1 and test 2) are superior to the conventional methods (i.e., test 3 and test 4) in terms of performance. Thus, the cases where the policy parameter θ was updated according to an embodiment of the are more efficient than the conventional methods, and the results show that learning ten times or more as efficient as the conventional methods was able to be achieved.

Figure 6:
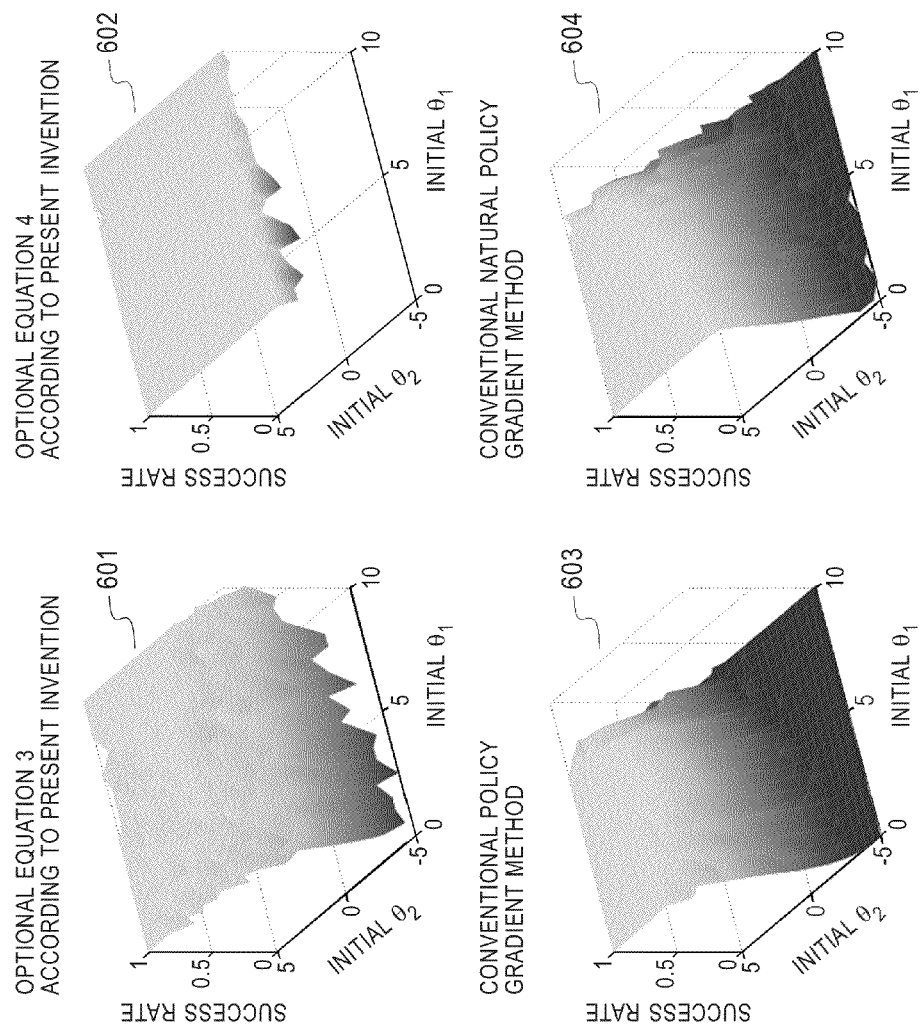
FIG. 6 contains charts showing the results of a comprehensive survey of initial value dependence according to the embodiment and the conventional methods when the policy parameter θ is updated in the Markov decision process in which the environment having two choices is generalized as shown in FIG. 3B.

FIG. 6 contains charts showing the results of a comprehensive survey of the initial value dependence according to the embodiment and the conventional methods when the policy parameter θ is updated in the Markov decision process in which an environment having two choices is generalized.

In the chart, the x-axis represents initial policy parameter $\theta_1$, the y-axis represents initial policy parameter $\theta_2$, and the z-axis represents success rate.

The initial policy is as follows:

$$Pr(A = \text{keep} | S = s_i; \theta) = \frac{1}{1 + \exp(-\theta_i)}$$ [Math. 29]

$$Pr(A = \text{change} | S = s_i; \theta) = 1 - Pr(A = \text{keep} | S = s_i; \theta)$$

In the tests, a probability that the average reward becomes 99% (1.98) or more of the optimum value (=2) within a given amount of time was checked.

Test 1 (601) is a case where the policy parameter θ is updated by using option 3 according to an embodiment.

Test 2 (602) is a case where the policy parameter θ is updated by using option 4 according to an embodiment.

Test 3 (603) is a case where the policy parameter θ is updated by using the policy gradient method as a conventional technique.

Test 4 (604) is a case where the policy parameter θ is updated by using the natural policy gradient method as another conventional technique.

From the results, it was found that the initial value dependence was able to be eliminated more overwhelmingly than the conventional methods (i.e., test 3 and test 4) especially in test 2. Even in test 1, it was found that the initial value dependence was able to be eliminated compared with the conventional methods (test 3 and test 4). Thus, the results show that, when the policy parameter θ is updated according to an embodiment, the initial dependence can be reduced compared with the conventional methods and the optimum policy can be almost always found.

The embodiments disclosed herein provide a technique for updating a policy parameter θ under a Markov decision process system environment. This technique is characterized in that the policy parameter θ is updated according to an update equation including a term for decreasing a weighted sum (hereinafter also called a "weighted sum of expected hitting times") over a first state (s) and a second state (s') of a statistic (hereinafter also called an "expected hitting time") on the number of steps (hereinafter also called a "hitting time") required to make a first state transition from the first state (s) to the second state (s').

The embodiments disclosed herein provide a method of updating a policy parameter θ defining a policy under a Markov decision process system environment. The method includes a step of updating the policy parameter θ stored in a storage section of a controller according to an update equation including a term for decreasing a weighted sum (weighted sum of expected hitting times) over a first state (s) and a second state (s') of a statistic (expected hitting time) on the number of steps (hitting time) required to make a first state transition from the first state (s) to the second state (s').

The embodiments disclosed herein also provide a method of updating, by computer processing, a policy parameter defining a policy under a Markov decision process system environment. This method includes a step of executing control logic created as software on the computer, wherein the control logic includes a step of updating the policy parameter stored in a storage section provided in the computer according to an update equation including a term for decreasing a weighted sum (weighted sum of expected hitting times) over a first state (s) and a second state (s') of a statistic (expected hitting time) on the number of steps (hitting time) required to make a first state transition from the first state (s) to the second state (s').

Embodiments further provide a controller for updating a policy parameter θ under a Markov decision process system environment. This controller includes a processor, a memory connected to the processor, and a storage device for storing code and a control program for executing each step of the above method, wherein the processor reads the control program into the memory to perform control in order to update the policy parameter θ.

Further, embodiments provide a controller for updating a policy parameter θ under a Markov decision process system environment. This controller includes a storage section for storing the policy parameter, and an update section for updating the policy parameter according to an update equation including a term for decreasing a weighted sum (weighted sum of expected hitting times) over a first state (s) and a second state (s') of a statistic (expected hitting time) on the number of steps (hitting time) required to make a first state transition from the first state (s) to the second state (s').

Further, embodiments provide a computer system for updating, by computer processing, a policy parameter defining a policy under a Markov decision process system environment. This computer system includes control logic to be executed as software on the computer, wherein the control logic includes a storage section for storing the policy parameter, and an update section for updating the policy parameter according to an update equation including a term for decreasing a weighted sum (weighted sum of expected hitting times) over a first state (s) and a second state (s') of a statistic (expected hitting time) on the number of steps (hitting time) required to make a first state transition from the first state (s) to the second state (s').

Further, embodiments provide a controller for learning, through observation of a state value of a target system, a policy stochastically expressed as a control rule for a state of the system when the time evolution of the system is described as a Markov decision process. This controller includes: a processor; a memory connected to the processor; a storage device for storing a control program; a control signal generation section for generating a control signal to control the system based on the policy; state value detection section for observing a state value of the system; and a reward value acquisition section for acquiring a reward value dependent on the state and the control signal in a predetermined relationship, wherein the policy is defined by a policy parameter θ as a parameter defining the stochastic policy, and the processor reads, from the storage device into the memory, the control program for executing each step of a method according to embodiments, and executes the read control program.

Further, embodiments provide a control program for updating a policy parameter θ under a Markov decision process system environment. This control program causes a controller to execute each step of the above method.

Further, embodiments provide a control program product for updating a policy parameter θ under a Markov decision process system environment. This control program product has the program.

In one embodiment, the expected hitting time can be (1) an expected value of the hitting time from the first state (s) to the second state (s'), or an estimate of the expected value, or (2) a value obtained by multiplying the expected value of the hitting time from the first state (s) to the second state (s') by a constant number and adding a constant to the resulting value, or an estimate of the value.

In another embodiment, the term for decreasing the weighted sum of expected hitting times can be derived by using a function h(s,s') (hereinafter also called an "expected hitting time function") whose arguments are the first state (s) and the second state (s') and whose return value is the expected hitting time from the first state (s) to the second state (s'), and a function (hereinafter called an "expected hitting time sensitivity function") whose arguments are the first state (s) and the second state (s') and whose return value is the sensitivity of the expected hitting time from the first state (s) to the second state (s') with respect to the policy parameter.

In still another embodiment, the sensitivity of the expected hitting time with respect to the policy parameter θ can be (1) a partial differentiation of the expected hitting time with respect to the policy parameter θ, or (2) an estimate of the partial differentiation of the expected hitting time with respect to the policy parameter θ.

In still another embodiment, the weighted sum of expected hitting times can be (1) a weighted sum over the first state (s) and the second state (s') of the expected hitting time function h(s,s'), (2) an addition average over the first state (s) and the second state (s') of the expected hitting time function h(s,s'), or (3) a maximum value over the first state (s) and the second state (s') of the expected hitting time function h(s,s').

In yet another embodiment, the method can include at least one of the steps of:

(1) updating the expected hitting time function h(s,s');

(2) calculating the expected hitting time using the expected hitting time function h(s,s'), and specifically calculating the expected hitting time for each of all state pairs;

(3) updating the expected hitting time sensitivity function; and (4) calculating the sensitivity of the expected hitting time with respect to the policy parameter by using the expected hitting time sensitivity function, and specifically calculating, for each of all state pairs, the sensitivity of the expected hitting time with respect to the policy parameter by using the expected hitting time sensitivity function.

Each of the steps (1) to (4) is executed independently without any dependence relationship thereamong. However, for example, if the expected hitting time function is updated in the step (1), the expected hitting time calculated in the step (2) can be changed. Further, the operations in the steps (2) and (4) does not need to be executed beforehand to execute the steps (1) and (3).

In yet another embodiment, the method can include:

the step (2) of calculating the expected hitting time using the expected hitting time function h(s,s'), and specifically a step of calculating the expected hitting time for each of all state pairs;

the step (4) of calculating the sensitivity of the expected hitting time with respect to the policy parameter by using the expected hitting time sensitivity function, and specifically a step of calculating, for each of all state pairs, the sensitivity of the expected hitting time with respect to the policy parameter; and a step of deriving, as a term for decreasing the weighted sum of expected hitting times, a vector calculated by weighted summing the sensitivity calculated in the step (4) based on each expected hitting time calculated in the step (2).

This method corresponds to the derivation of a term for decreasing the weighted sum of expected hitting times. To derive the term for decreasing the weighted sum of expected hitting times, each of the operations in the steps (2) and (4) can be required.

In yet another embodiment, the step (1) of updating the expected hitting time function can include a step of updating the expected hitting time function by using the expected hitting time of each state pair $(s_t,s')$, $s' \in S$ at time step t, which state $s_t$ at time step t can take, and the expected hitting time of each state pair $(s_t,s')$, $s' \in S$ at time step t+1, which state $s_t$ at time step t can take, and specifically a step of calculating the expected hitting time function by using the expected hitting times of all state pairs $(s_t,s')$, $s' \in S$ at time step t, which state $s_t$ at time step t can take, and the expected hitting times of all state pairs $(s_t,s')$, $s' \in S$ at time step t+1, which state $s_t$ at time step t can take, where S denotes a discrete state set.

In still another embodiment, the method can further include a step of initializing the expected hitting time function h(s,s') at time step 0.

In still another embodiment, the expected hitting time function h(s,s') can be initialized by using the following equation:

$$h: S \times S \to \mathbb{R}^+,$$ [Math. 30]

where h denotes the expected hitting time function,

S denotes a discrete state set, and $\mathbb{R}^+$ denotes a set of real vectors not less than zero, and when s=s', $h(s_t,s'):=0$.

In still another embodiment, the expected hitting time function h(s,s') at each time step t+1 can be updated according to the following equations:

$$h(s_t,s'):=h(s_t,s')+\alpha_t \delta_t(s'), s' \in S,$$ [Math. 31]

where h denotes the expected hitting time function,

:= denotes substitution, $\alpha_t$ denotes a learning rate, which may depend on time step t, and δ denotes an error, and
when $s_t=s'$, $h(s_t,s'):=0$, and $$\delta_t(s') = \begin{cases} 0, & \text{if } s' = s_t \\ 1 + h(s_{t+1}, s') - h(s_t, s'), & \text{otherwise} \end{cases}, \quad [\text{Math. 32}]$$

where $1+h(s_{t+1},s')$, $s' \in \{s \neq s_t, s \in S\}$ is the expected hitting time of the state pair $(s_t,s')$, $s' \in \{s \neq s_t, s \in S\}$ at time step t+1, which is related to state $s_t$ at time step t, and $h((s_t,s'))$, $s' \in S$ is the expected hitting time of the state pair $(s_t,s')$, $s' \in S$ at time step t, which is related to state $s_t$ at time step t.

In yet another embodiment, the step (2) of calculating the expected hitting time using the expected hitting time function can include a step of calculating the expected hitting time from statistics for estimating the expected hitting time function (hereinafter also called "estimation of the expected hitting time function"), and the step (1) of updating the expected hitting time function at each time step t+1 can include a step of updating the statistics for estimation of the expected hitting time function.

In a further embodiment, the method can further include a step of initializing, at time step 0, a matrix storing the statistics for estimation of the expected hitting time function.

In a further embodiment, the matrix storing the statistics for estimation of the expected hitting time function can be initialized by using the following equation:

$$A \in \mathbb{R}^{|S| \times |S|}, b \in \mathbb{R}^{|S| \times 1}, \quad [\text{Math. 33}]$$

where A denotes the matrix as the statistics for estimation of the expected hitting time function, S denotes a discrete state set,

|S| denotes the number of elements in the discrete state set, $\mathbb{R}$ denotes a set of real numbers not less than zero, and b denotes a vector as the statistics for estimation of the expected hitting time function.

In a further embodiment, the matrix storing the statistics for estimation of the expected hitting time function can be initialized by using the following equation:

$$A := I_{|S|}, b := e_{|S|}, \quad [\text{Math. 34}]$$

where := denotes substitution, $I_{|S|}$ denotes a unit matrix of $|S| \times |S|$, and $e_{|S|}$ denotes a vector of which all components of $|S| \times 1$ are 1.

In a further embodiment, the step of updating the statistics for estimation of the expected hitting time function can include a step of updating, at each time step t+1, a matrix A and a vector b as the statistics for estimation of the expected hitting time function according to the following equation:

$$A := \beta_t A + e(s_t)\{e(s_t) - e(s_{t+1})\}^T$$

$$b := \beta_t b + e(s_t) \quad [\text{Math. 35}]$$

where := denotes substitution, $e_{|S|}(i)$ denotes a vector whose i-th component is 1 and other components are 0, $\beta_t$ denotes a forgetting rate, which may depend on time step t, and $[\ldots]^T$ denotes a transpose of the vector.

In a further embodiment, the expected hitting time can be calculated by using the following equation:

$$h(s,s') := \begin{cases} 0, & \text{if } s = s' \\ (A_{/s'}^{-1} b_{/s'})_s, & \text{otherwise} \end{cases}, \quad [\text{Math. 36}]$$

where := denotes substitution, $A_{/s'}$ denotes a matrix obtained by removing the s'-th row and the s'-th column from the matrix A, $(b)_s$ denotes the s-th component of the vector b, and $b_{/s'}$ denotes a vector obtained by removing the s'-th component from the vector b.

In a further embodiment, the step (3) of updating the expected hitting time sensitivity function can include a step of updating the expected hitting time sensitivity function by using the sensitivity of the expected hitting time of each state pair $(s_t,s')$, $s' \in S$ at time step t with respect to the policy parameter, which state $s_t$ at time step t can take, and the sensitivity of the expected hitting time of each state pair $(s_t,s')$, $s' \in S$ at time step t+1 with respect to the policy parameter, which state $s_t$ at time step t can take, and specifically a step of calculating the expected hitting time sensitivity function by using the sensitivities of the expected hitting times of all state pairs $(s_t,s')$, $s' \in S$ at time step t with respect to the policy parameter θ, which state $s_t$ at time step t can take, and the sensitivities of the expected hitting times of all state pairs $(s_t,s')$, $s' \in S$ at time step t+1 with respect to the policy parameter θ, which state $s_t$ at time step t can take.

In a further embodiment, the method can include a step of initializing the expected hitting time sensitivity function at time step 0.

In a further embodiment, the expected hitting time sensitivity function can be initialized by using the following equation:

$$\nabla h: S \times S \to \mathbb{R}^d, \quad [\text{Math. 37}]$$

where $\nabla h$ denotes the expected hitting time sensitivity function,

S denotes a discrete state set, $\mathbb{R}^d$ denotes a set of real vectors whose d dimension is 0 or more, and d is the number of dimensions of the policy parameter θ, and when $s_t=s'$, $\nabla h(s_t,s'):=0$.

In a further embodiment, the expected hitting time sensitivity function at each time step t+1 can be updated according to the following equations:

$$\nabla h(s_t,s') := \nabla h(s_t,s') + \alpha_t \delta_t(s'), \forall s' \in S, \quad [\text{Math. 38}]$$

where $\nabla h$ denotes the expected hitting time sensitivity function,

:= denotes substitution, $\alpha_t$ denotes a learning rate, which may depend on time step t, and δ denotes an error, and when $s_t=s'$, $\nabla h(s_t,s'):=0$, and $$\delta_t(s') = \begin{cases} 0, & \text{if } s' = s_t \\ h(s_{t+1}, s')\nabla_\theta \log Pr(a_t|s_t, \theta) + \nabla h(s_{t+1}, s') \\ -\nabla h(s_t, s'), & \text{otherwise} \end{cases}, \quad [\text{Math. 39}]$$

where $h(s_{t+1},s')\nabla_\theta \log Pr(a_t|s_t,\theta)+\nabla h(s_{t+1},s')$ expresses the sensitivity of the state pair $(s_t,s')$, $s' \in \{s \neq s_t, s \in S\}$ at time step t+1, which is related to state $S_t$ at time step t and in which h denotes the expected hitting time function, ∇h denotes the expected hitting time sensitivity function, ∇h($s_t$,s') denotes the sensitivity of the state pair ($s_t$,s'), s'∈S at time step t, which is related to state $s_t$ at time step t, and $\nabla_\theta$ log Pr($a_t|s_t,\theta$) denotes a partial differentiation of the logarithm of a probability of selecting action $a_t$ in state $s_t$ defined by the policy Pr(a|s,θ) with respect to the policy parameter θ.

In a further embodiment, the step (4) of calculating a vector as an estimated sensitivity of the expected hitting time (the sensitivity of the expected hitting time with respect to the policy parameter) using the expected hitting time sensitivity function can include a step of calculating the sensitivity of the expected hitting time with respect to the policy parameter from statistics for estimating the expected hitting time sensitivity function (hereinafter also called "estimation of the expected hitting time sensitivity function"), and specifically a step of calculating the sensitivity of the expected hitting time of each of all states with respect to the policy parameter. Further, the step (3) of updating the expected hitting time sensitivity function can include a step of updating the statistics for the expected hitting time sensitivity function.

In a further embodiment, the method can further include a step of initializing, at time step 0, a matrix storing statistics for estimation of the expected hitting time sensitivity function.

In a further embodiment, the matrix storing the statistics for estimation of the expected hitting time sensitivity function can be initialized by using the following equation:

$$A \in \mathbb{R}^{|S| \times |S|}, B \in \mathbb{R}^{|S| \times d}, \quad \text{[Math. 40]}$$

where A denotes a matrix as the statistics for estimation of the expected hitting time sensitivity function, S denotes a discrete state set,

|S| denotes the number of elements in the discrete state set, $\mathbb{R}^d$ denotes a set of d-dimensional real vectors, B denotes a matrix as the statistics for estimation of the expected hitting time sensitivity function, and d denotes the number of dimensions of the policy parameter θ.

In a further embodiment, the matrix storing the statistics for estimation of the expected hitting time sensitivity function can be initialized by using the following equation:

$$A := I_{|S|}, B := 0, \quad \text{[Math. 41]}$$

where A denotes a matrix as the statistics for estimation of the expected hitting time sensitivity function, :=denotes substitution, $I_{|S|}$ denotes a unit matrix of |S|×|S|, and B denotes a matrix as the statistics for estimation of the expected hitting time sensitivity function.

In a further embodiment, the method can further include a step of updating, at each time step t+1, a matrix A and a matrix B as the statistics for estimation of the expected hitting time sensitivity function according to the following equation, where the policy parameter θ can be updated by using the updated matrix A and matrix B:

$$A := \beta_t A + e(s_t)\{e(s_t) - e(s_{t+1})\}^T$$

$$B := \beta_t B + e(s_t) h(s_{t+1},:) \nabla_\theta \log Pr(a_t|s_t,\theta)^T, \quad \text{[Math. 42]}$$

where :=denotes substitution, e(i) denotes a vector whose i-th component is 1 and other components are 0, $\beta_t$ denotes a forgetting rate, which may depend on time step t, h($s_{t+1}$,:) denotes a column vector [h($s_{t+1}$,1), ..., h($s_{t+1}$,|S|)]$^T$ with elements the number of which is |S|, $a_t$ denotes an action, $\nabla_\theta$ log Pr($a_t|s_t,\theta$)$^T$ denotes a partial differentiation of a probability model Pr(a|s;θ) with respect to the policy parameter θ, and

[ ... ]$^T$ denotes a transpose of the vector.

In a further embodiment, the sensitivity of the expected hitting time with respect to the policy parameter can be calculated by using the following equation:

$$\nabla h(s, s') := \begin{cases} 0, & \text{if } s = s' \\ (A_{/s'}^{-1} B_{/s'})^T_{s,:}, & \text{otherwise} \end{cases}, \quad \text{[Math. 43]}$$

where :=denotes substitution, 0 denotes a column vector whose number of elements is d and all elements are zero, $A_{/s'}$ denotes a matrix obtained by removing the s'-th row and the s'-th column from the matrix A, (A)$_{\{s,:\}}$ denotes the s-th row of the matrix A, $B_{/s'}$ denotes a matrix obtained by removing the s'-th row from the matrix B, and

[ ... ]$^T$ denotes a transpose of the vector.

In a further embodiment, the policy parameter θ can be updated by using the following equation:

$$\theta_{t+1} = \theta_t + \alpha_t \left\{ \Delta\theta - \lambda_t f\left( \sum_{s \in S} \sum_{s' \in S} w_{s,s'}(h) \nabla_\theta h(s, s'; \theta_t) \right) \right\}, \quad \text{[Math. 44]}$$

where θ denotes the policy parameter, $\alpha_t$ denotes a learning rate, which may depend on time step t, Δθ denotes a direction of updating θ by any method for updating the policy parameter based on a gradient method, $\lambda_t$ denotes a regularization rate, which may depend on time step t, f denotes any function, h denotes the expected hitting time function, $w_{s,s'}$(h) denotes a functional of the expected hitting time function (h) using the weighted value for the state pair (s,s') as a return value, and $\nabla_\theta$h denotes the sensitivity of the expected hitting time of the state pair (s,s') with respect to the policy parameter.

In a further embodiment, the above equation used to update the policy parameter θ can be expressed in the following equation:

$$\theta_{t+1} = \theta_t + \alpha_t \left\{ \Delta\theta - \lambda_t \sum_{s \in S} \sum_{s' \in S} w_{s,s'}(h) \nabla_\theta h(s, s'; \theta_t) \right\}, \quad \text{[Math. 45]}$$

where θ denotes the policy parameter, $\alpha_t$ denotes a learning rate, which may depend on time step t, Δθ denotes a direction of updating θ by any method for updating the policy parameter based on a gradient method, $\lambda_t$ denotes a regularization rate, which may depend on time step t, h denotes the expected hitting time function, $w_{s,s'}$(h) denotes a functional of the expected hitting time function (h) using the weighted value for the state pair (s,s') as a return value, and $\nabla_\theta h$ denotes an estimate of the partial differentiation of the state pair (s,s').

In a further embodiment, the above equation used to update the policy parameter $\theta$ can be expressed in the following equation:

$$\theta_{t+1} = \theta_t + \qquad\qquad\qquad\qquad\qquad\qquad\text{[Math. 46]}$$
$$\alpha_t \left\{ \Delta\theta - \lambda_t \max(R^* - \hat{R}, 0) \sum_{s \in S} \sum_{s' \in S} w_{s,s'}(h) \nabla_\theta h(s, s'; \theta_t) \right\},$$

where $\theta$ denotes the policy parameter, $\alpha_t$ denotes a learning rate, which may depend on time step t, $\Delta\theta$ denotes a direction of updating $\theta$ by any method for updating the policy parameter based on a gradient method, $\lambda_t$ denotes a regularization rate, which may depend on time step t, $R^*$ denotes a target average reward value, $\hat{R}$ A denotes an estimated average reward value, h denotes the expected hitting time function, $w_{s,s'}(h)$ denotes a functional of the expected hitting time function (h) using the weighted value for the state pair (s,s') as a return value, and $\nabla_s h$ denotes the sensitivity of the expected hitting time of the state pair (s,s') with respect to the policy parameter.

In a further embodiment, the above $w_{s,s'}(h)$ can be the following equation:

$$w_{s,s'}(h) = \begin{cases} 1, & \text{if } h(s, s') \geq h(i, j), \forall i, j \in S, \\ 0, & \text{otherwise} \end{cases}, \text{ or} \quad \text{[Math. 47]}$$

$$w_{s,s'}(h) = 1, \forall s, s' \in S, \qquad\qquad\qquad\qquad\text{[Math. 48]}$$

where h denotes the expected hitting time function.

Technical effects and benefits of the disclosed embodiments include suppressing a temporal scale (which can also be a mixing time) under a Markov decision process system environment to enable efficient learning compared with a natural policy gradient method of a conventional method. Further, according to the embodiments, initial value dependence can be reduced overwhelmingly compared with the natural policy gradient method of the conventional method, and the optimum policy can be almost always be found. Embodiments disclosed herein can be applied to a problem formulated as a Markov decision process, e.g., an autonomous control problem of a business decision-making model, a robot, a plant, a mobile vehicle (e.g., a train, a car, a ship, or an airplane). Embodiments can also be applied to a business decision-making model (e.g., decision-making support for marketing, a Web service, or the like).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer system for updating a policy parameter defining a policy under a Markov decision process system environment, the system comprising a controller and a memory, the system configured to perform a method comprising:
   updating, by the controller, the policy parameter stored in a storage section of the controller according to an update equation, the update equation further comprising a term for decreasing a weighted sum of expected hitting times over a first state (s) and a second state (s') of a statistic on the number of steps required to make a first state transition from the first state (s) to the second state (s').

2. The computer system according to claim 1, wherein deriving the term for decreasing the weighted sum of expected hitting times comprises:
   applying an expected hitting time function whose arguments are the first state (s) and the second state (s') and whose return value is the expected hitting time from the first state (s) to the second state (s'), and
   applying an expected hitting time sensitivity function whose arguments are the first state (s) and the second state (s') and whose return value is a sensitivity of the expected hitting time from the first state (s) to the second state (s') with respect to the policy parameter.

3. The computer system according to claim 2, wherein the sensitivity of the expected hitting time with respect to the policy parameter comprises a partial differentiation of the expected hitting time with respect to the policy parameter, or an estimate of the partial differentiation.

4. The computer system according to claim 2, wherein the weighted sum of expected hitting times comprises:
   (1) a weighted sum over the first state (s) and the second state (s') of the expected hitting time function,
   (2) an addition average over the first state (s) and the second state (s') of the expected hitting time function, or
   (3) a maximum value over the first state (s) and the second state (s') of the expected hitting time function.

5. The computer system according to claim 1, wherein the expected hitting time comprises:
   (1) an expected value of the hitting time from the first state (s) to the second state (s'), or an estimate of the expected value, or
   (2) a value obtained by multiplying the expected value of the hitting time from the first state (s) to the second state (s') by a constant number and adding a constant to the resulting value, or an estimate of the value.

6. The computer system according to claim 2, wherein the controller executes at least one of:
   (1) updating the expected hitting time function;
   (2) calculating the expected hitting time using the expected hitting time function;
   (3) updating the expected hitting time sensitivity function; and
   (4) calculating the sensitivity of the expected hitting time with respect to the policy parameter by using the expected hitting time sensitivity function.

7. The computer system according to claim 6, wherein the step (1) of updating the expected hitting time function comprises:
   a step of updating the expected hitting time function by using the expected hitting time of each state pair $(s_t, s')$, $s' \in S$ at time step t, which state $s_t$ at time step t can take, and the expected hitting time of each state pair $(s_t, s')$, $s' \in S$ at time step t+1, which state $s_t$ at time step t can take.

8. The computer system according to claim 6, wherein the step (2) of calculating the expected hitting time using the expected hitting time function comprises:
- a step of calculating the expected hitting time from statistics for estimating the expected hitting time function (hereinafter called "estimation of the expected hitting time function"), and
- the step (1) of updating the expected hitting time function at each time step t+1 comprises a step of updating the statistics for estimation of the expected hitting time function.

9. The computer system according to claim 6, wherein the step (3) of updating the expected hitting time sensitivity function comprises:
- a step of updating the expected hitting time sensitivity function by using the sensitivity of the expected hitting time of each state pair $(s_t, s')$, $s' \in S$ at time step t with respect to the policy parameter, which state $s_t$ at time step t can take, and the sensitivity of the expected hitting time of each state pair $(s_t, s')$, $s' \in S$ at time step t+1 with respect to the policy parameter, which state $s_t$ at time step t can take.

10. The computer system according to claim 6, wherein the step (4) of calculating the sensitivity of the expected hitting time with respect to the policy parameter by using the expected hitting time sensitivity function comprises:
- a step of calculating the sensitivity of the expected hitting time from statistics for estimating the expected hitting time sensitivity function with respect to the policy parameter, and
- the step (3) of updating the expected hitting time sensitivity function comprises a step of updating the statistics for the expected hitting time sensitivity function.

* * * * *